Figure 1:
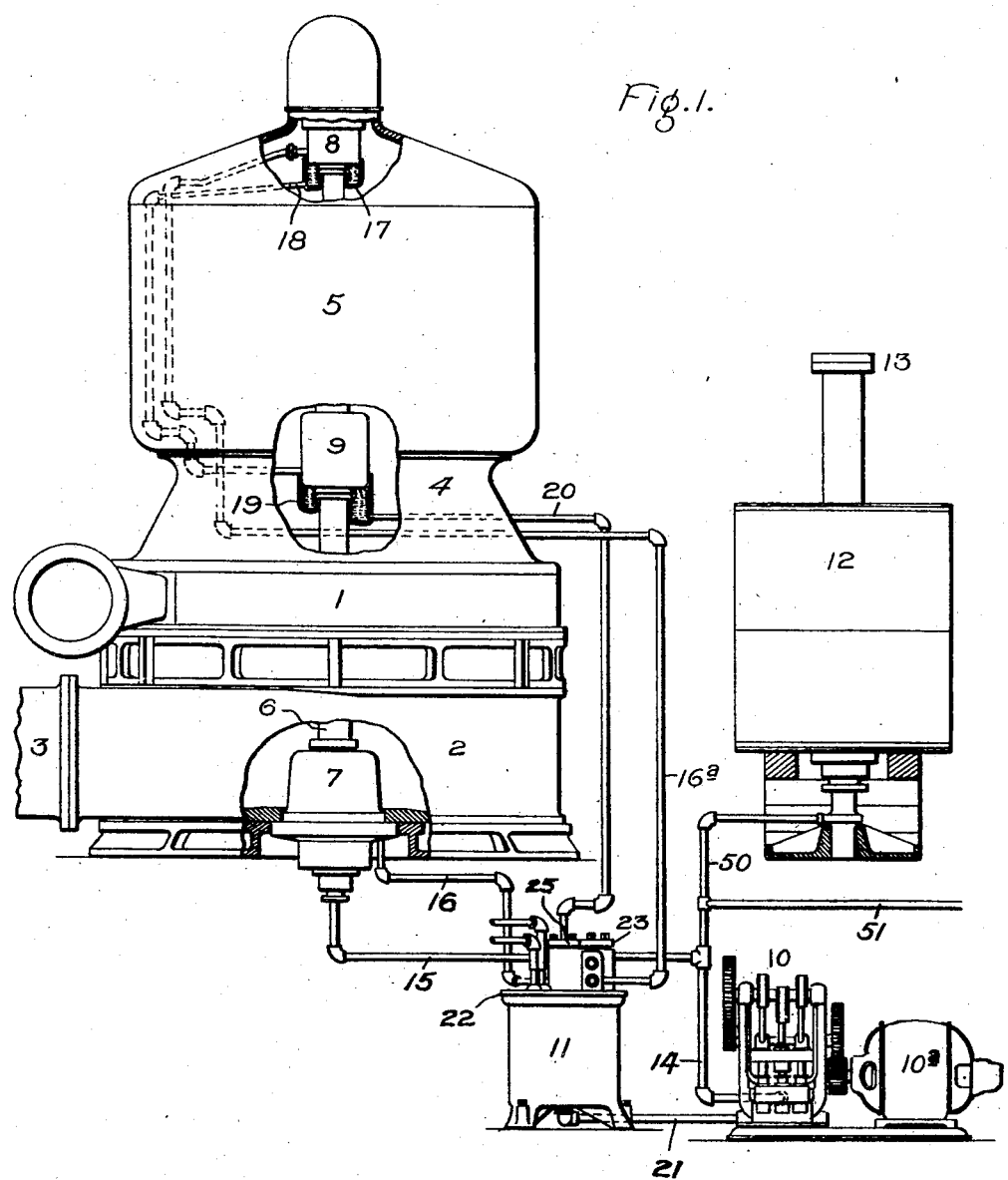

No. 846,794. PATENTED MAR. 12, 1907.
A. H. KRUESI.
MEANS FOR SUPPLYING LUBRICANT FOR THE BEARINGS OF ELASTIC FLUID TURBINES.
APPLICATION FILED JAN. 11, 1905.

3 SHEETS—SHEET 1.

Witnesses:
Marcus L. Byng
Alex. F. McDonald

Inventor
August H. Kruesi,
by Albert G. Davis
Atty.

No. 846,794. PATENTED MAR. 12, 1907.
A. H. KRUESI.
MEANS FOR SUPPLYING LUBRICANT FOR THE BEARINGS OF ELASTIC FLUID TURBINES.
APPLICATION FILED JAN. 11, 1905.

3 SHEETS—SHEET 2.

Witnesses:
Marcus L. Byng.
Alex. F. Macdonald.

Inventor:
August H. Kruesi,
by Albert G. Davis
Att'y.

No. 846,794.  
PATENTED MAR. 12, 1907.  
A. H. KRUESI.  
MEANS FOR SUPPLYING LUBRICANT FOR THE BEARINGS OF ELASTIC FLUID TURBINES.  
APPLICATION FILED JAN. 11, 1905.

3 SHEETS—SHEET 3.

Witnesses:  
Marcus L. Byng.  
Alex F. Macdonald.

Inventor:  
August H. Kruesi  
by Albert G. Davis  
Att'y.

UNITED STATES PATENT OFFICE.

AUGUST H. KRUESI, OF SCHENECTADY, NEW YORK, ASSIGNOR TO GENERAL ELECTRIC COMPANY, A CORPORATION OF NEW YORK.

MEANS FOR SUPPLYING LUBRICANT FOR THE BEARINGS OF ELASTIC-FLUID TURBINES.

No. 846,794.     Specification of Letters Patent.     Patented March 12, 1907.

Application filed January 11, 1905. Serial No. 240,546.

*To all whom it may concern:*

Be it known that I, AUGUST H. KRUESI, a citizen of the United States, residing at Schenectady, county of Schenectady, State of New York, have invented certain new and useful Improvements in Means for Supplying Lubricant for the Bearings of Elastic-Fluid Turbines, of which the following is a specification.

In supplying oil, water, or other lubricant to elastic-fluid turbines, and particularly to those of the vertical type, it is necessary to maintain a continuous supply of lubricant under pressure to the bearings, and especially to the step or thrust bearing, where such a bearing is used, which supports the weight of the moving parts. The lubricant supplied to the step-bearing has to be under a relatively high pressure, while that supplied to the guide-bearings may be, and usually is, under relatively low pressure. In order to simplify matters, a single pump may be employed for maintaining both the high and low pressure service. In addition to the pump an auxiliary device, such as a dead-weight accumulator, may be employed, which comes into service when the pump fails wholly or in part. In order to cause the lubricant to divide in the proper proportions between the bearings and between the bearings and dead-weight accumulator where the latter is employed, baffling devices are provided, which, moreover, automatically regulate the flow and maintain it substantially constant irrespective of variations in pressure.

The present invention has for its object to provide an improved baffling, equalizing, and cooling means whereby the supply of lubricant to the bearings of one or more turbines can be effectively maintained.

In carrying out the invention a suitable pump is provided—such, for example, as a multicylinder-pump driven by an electric motor or other source of power. The pump delivers the lubricant, which may be oil, water, or other fluid, to the bearing or bearings of one or more turbines and to a dead-weight accumulator where such a device is employed. Between the pump and the bearings are bafflers of novel construction. The purpose of these bafflers is fourfold: first, to enable turbines to be operated in parallel from one or more lubricant-supplying pumps and divide the lubricant in proportion to their requirements; second, to maintain a regular flow of lubricant; third, to prevent sudden emptying of a dead-weight accumulator if such a device is used, and, fourth, to keep the dead-weight accumulator always filled.

The bafflers are preferably similar in construction, but differ as to the amount of resistance they oppose to the lubricant. Mounted within a cylindrical chamber is a baffler comprising a plug or piece having an external thread, the peripheral surface of which engages the wall of the chamber, thus forming a relatively long spiral passage for the fluid of considerable cross-section. The resistance to the flow of fluid in a given passage depends upon the length thereof, the number of bends or sharp turns therein, and upon its cross-section. The cross-section of the passage should be as great as possible consistent with the required resistance in order to reduce the danger of clogging and to reduce the velocity, and hence the erosion or cutting. The baffler is therefore provided with a large number of bends or turns and with a passage of considerable length.

The baffler of the present invention has the advantage of occupying a small space, is readily adjusted, is easily assembled and disassembled, and is capable of being used under a wide range of conditions as regards the amount of fluid to be handled and the amount of frictional resistance. It is less subject to change than the ordinary throttling-valve, for the reason that it is less likely to cut due to lower velocity of the fluid. It is also more readily adjusted, since the length of path is vastly greater than would be the case in any throttling-valve. The arrangement also affords a simple and cheap construction, and by changing the plugs the resistance can be varied to suit the requirements without altering the other parts in any way. The resistance can also be varied by moving the screw-threaded piece lengthwise within its chamber, and thereby rendering a few turns of the thread at the end operative or inoperative. I have had numerous experiments made which demonstrate that the friction-head through such a baffler varies in direct proportion to the square of the velocity flowing through it, as it should theoretically.

Beyond the main baffler and between it and the step-bearing is a spring-pressed plunger for equalizing the pulsatory discharge of the pump. By placing the equalizer beyond the baffler the amount of work that it is called upon to do is lessened, thus decreasing the wear. Since under high pressure the guide-bearings do not, as a rule, require oil and the effect of the pulsations is practically eliminated by the high-resistance baffler, I deem it unnecessary to use an equalizer therefor, but may do so under certain conditions, in which case it may with advantage be arranged the same as the one for the step-bearing supply.

Between the pump and the high and low resistance bafflers, which are connected in multiple, is a removable strainer for separating foreign matter from the lubricant. The bafflers and screen are mounted in a common support, which is preferably mounted on top of a casing containing a chamber receiving the spring of the equalizer, a strainer for separating foreign matter from the exhaust or lubricant returned from the bearings, and a coil adapted to receive water or other cooling fluid.

In addition to the above a means is provided, such as a cylindrical wall or partition, for causing the exhaust fluid to circulate through the cooling-coil and be relieved of its heat before leaving the casing through an opening in the bottom that is in communication with the suction side of the pump. The spring of the equalizer, the cylindrical partition, and the cooling-coil are nested one within the other, and all are inclosed by the casing. By reason of this arrangement a construction of minimum size is obtained, especially in the longitudinal dimension.

Figure 2:
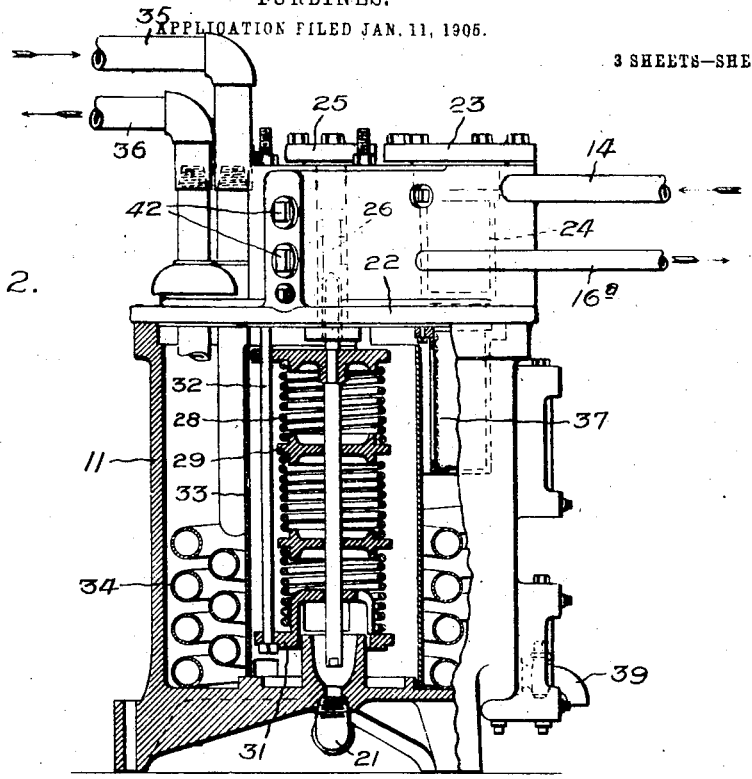
Figure 3:
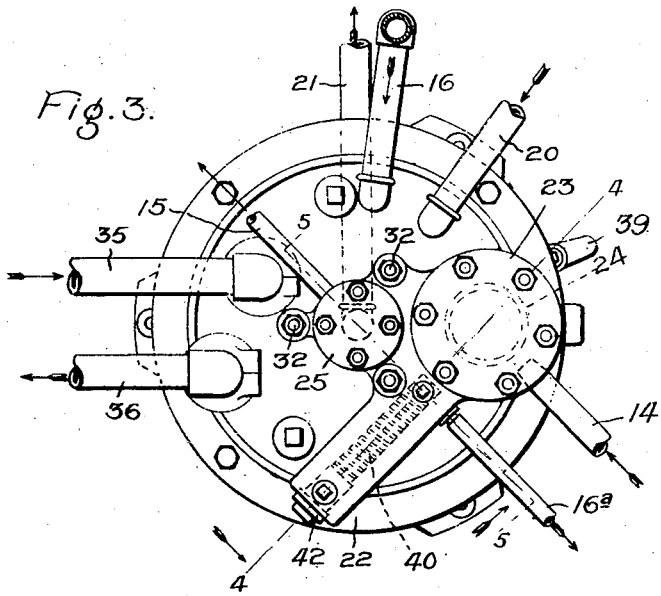
Figure 4:
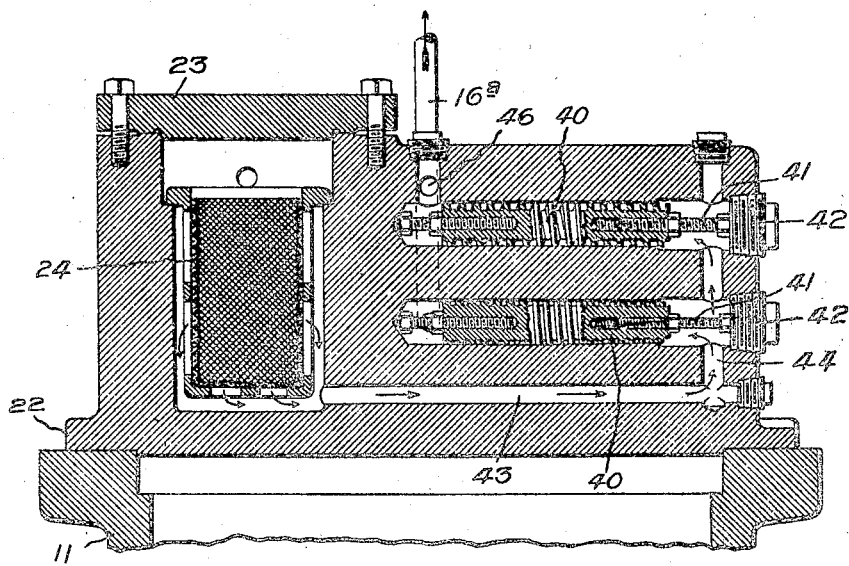
Figure 5:
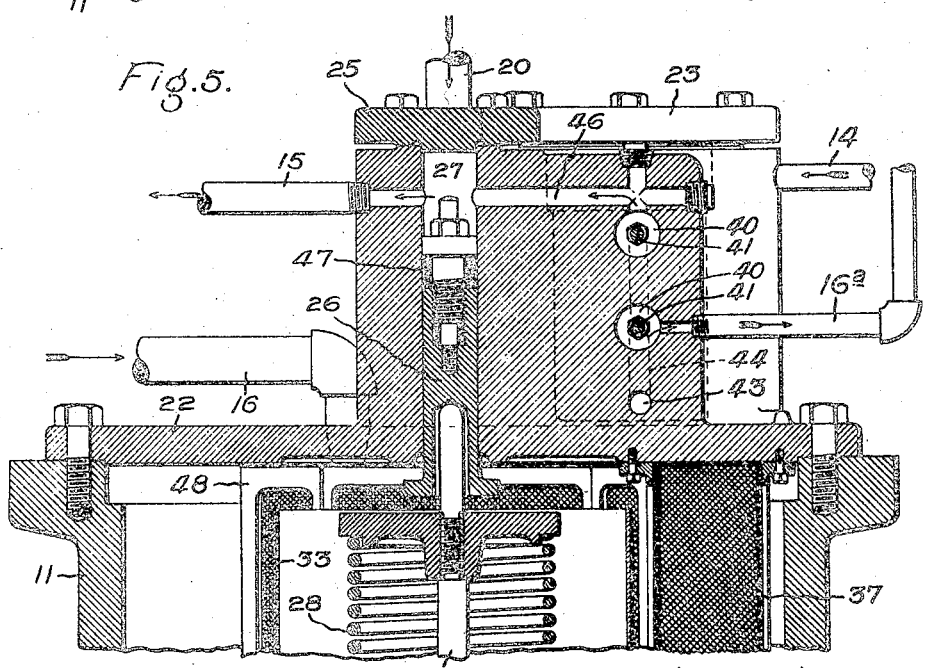

In the accompanying drawings, which illustrate one embodiment of my invention, Figure 1 is a view in side elevation of a vertical turbine, together with an electrically-driven pump and an accumulator for supplying lubricant to the step and guide bearings. Fig. 2 is a view in side elevation, certain of the parts being in section, of the combined baffling, equalizing, and cooling devices. Fig. 3 is a plan view of the same. Fig. 4 is a sectional view of the cover, taken on line 4 4 of Fig. 3; and Fig. 5 is a sectional view taken on line 5 5 of Fig. 3 and looking in the direction of the arrow.

Referring first to Fig. 1, 1 represents a vertical turbine mounted on a base 2, which is or may be connected to a condenser by the tube 3. Situated above the turbine is a shell 4, which carries a dynamo-electric machine 5 or other load. 6 represents a vertical shaft which is common to the turbine and the dynamo and whose lower end is mounted in a step-bearing 7, which is detachable from the under side of the turbine-base. The upper end of the shaft is guided by bearing 8, and the shaft is also guided by an intermediate bearing 9. The lower end of the shaft, in addition to being supported by the step-bearing, is provided with a guide-bearing (not shown) that is located within the step-bearing casing. 10 represents a power-driven pump, preferably a triplex pump, which is driven through suitable reducing-gearing by the electric motor $10^a$, the motor and pump being mounted on the same base. Situated slightly above the level of the suction-valve of the pump is a casing 11, containing high and low resistance bafflers and equalizing devices and the cooling-coil, which will be hereafter referred to. 12 represents a dead-weight accumulator of suitable construction, which is loaded to give a pressure slightly below that due to the pump. This is done in order that the pump 10 can fill the accumulator when empty and keep it filled, as well as to supply lubricant to the step-bearing. To limit the upward movement of the movable part of the accumulator, a stop 13 is provided. When the parts are first started into operation and the accumulator is empty, the step-bearing and accumulator will receive the fluid in substantially equal amount, until the movable part of the accumulator strikes the stop, after which all of the fluid from the pump goes to the step and guide bearings. 14 represents the discharge-pipe of the pump, which is connected directly to the accumulator and discharges to the step and guide bearings through suitable bafflers. 15 represents the pipe supplying high-pressure lubricant to the step-bearing, and 16 the pipe returning the used oil to the tank or casing 11. The lubricant is carried to the upper bearing by the pipe $16^a$, and after passing through the bearing it is collected in the trough 17 and is conveyed by means of the pipe 18 to the upper end of the intermediate guide-bearing 9. After passing through the guide-bearing the lubricant is collected in a trough 19 and returned to the tank 11 by the pipe 20. The under side of the tank is connected to the suction side of the pump by a pipe 21.

The details of construction will now be described.

11 represents a tank or casing, which is preferably provided with suitable feet by means of which it can be attached to a support. The casing serves as a receiver for the lubricant returning from the bearings and is closed in by a cover 22, which contains the bafflers and a strainer. Bolted or otherwise secured to the cover is the plate 23, which when detached exposes the removable strainer 24. (Shown in dotted lines in Fig. 2 and in full lines in Fig. 4.) A second plate or cover 25 is also provided, which when removed exposes the end of the equalizing device 26. (Shown in dotted lines, Fig. 2, and in full lines, Fig. 5.) The equalizing device comprises a suitable plug-piston, which is movable within the cylinder 27. The pressure of the lu bricant tends to depress the piston within the cylinder, while the spring 28 tends to move it in an upward direction. The spring 28 is divided into sections, and between the sections are placed flanged guide-plates 29, which are mounted on the rod 30 and prevent the spring from buckling. The lower end of the spring is set on an abutment 31, which also engages the rod 30 and is limited as to its downward movement by one or more rods 32. In the present instance three of these rods are shown and located at one hundred and twenty degrees apart. These rods pass up through the cover and are secured in place by nuts. By reason of this construction the equalizer can be removed with the cover without disturbing the adjustment of the parts. Surrounding the spring is a cylindrical wall or partition 33, which causes the lubricant received from the bearings to circulate more or less completely among the turns of a cooling-coil prior to passing to the suction-pipe 21 of the pump. Surrounding the cylindrical wall and the spring is the cooling-coil 34, comprising an inner and an outer coil, which are nested in order to obtain a maximum cooling effect with a minimum length of coil. The coils are connected in series and the ends project upward through the cover, where they are attached to an inlet-pipe 35 and the discharge-pipe 36. Situated above the cooling-coil and between the cylindrical wall 33 and the outer wall of the casing or tank is a strainer 37, which receives the lubricant on its returning from the bearings. This strainer is detachably secured to the under side of the cover and is so arranged that it covers a segment of a circle.

In Fig. 3 the arrows represent the direction of flow of the lubricant. 14 is the discharge-pipe of the pump which delivers lubricant to the strainer 24, from which the lubricant passes to the high and low resistance bafflers. 15 represents the pipe leading to the step-bearing, and 16 the pipe returning the lubricant from the step-bearing. 16$^a$ represents the pipe supplying lubricant to the upper and intermediate guide-bearings, and 20 the return-pipe therefor. It is to be noted that the returning-pipes 16 and 20 are adjacent to each other and are directly over the strainer 37, so that all lubricant returning from the bearings has to first pass through the strainer. 35 represents the pipe supplying fluid to the cooling-coil within the casing, and 36 the discharge-pipe therefor. 21 represents the pipe leading from the under side of the casing to the suction side of the pump. To the lower end of the casing is attached a drain-cock 39 for draining off the contents of the casing.

The cover 22 is chambered out to receive the frame for the detachable strainer 24. By removing the cover 23 the strainer can be readily removed and cleaned in case it becomes clogged. The hole just above the strainer is in communication with the discharge-pipe 14 of the pump. The cover is provided with as many cylindrical chambers as there are bafflers, and mounted in each of these chambers is a screw-threaded plug 40, which forms a baffling device for the lubricant. These baffling devices are adjustable to a limited extent in a longitudinal direction by changing the position of the adjusting-bolts 41. When the bafflers are in the position shown, they are offering the maximum resistance to the passage of lubricant; but when they are moved to the right, Fig. 4, so that one or more turns of the thread are exposed to the vertically-extending passage, their effect is decreased. The upper baffler is included in the supply-pipe leading to the step-bearing, and the lower baffler is included in the supply-pipe leading to the upper and intermediate guide-bearings. Owing to the fact that the pressure is greater on the step than on the guide bearings, the resistance of the flow in the former case should be less than in the latter case. The thread is therefore coarser and the pitch greater in the former. The cylindrical openings containing the bafflers are closed by screw-threaded plugs 42, and by removing the plug the baffler can be readily removed and cleaned, if desired, or a new one substituted without in any way disturbing the balance of the apparatus. The bafflers receive fluid in multiple from the passage 43, formed directly underneath them. This passage communicates with a vertically-extending passage 44, which is closed by a screw-threaded plug at the upper end, and communicates with the cylindrical chambers containing the bafflers. The upper or low-resistance baffler discharges into the pipe 15 through the passage 46, while the high-resistance lower baffler discharges into the pipe 16$^a$. The relation between these bafflers and the discharge-pipe is more fully shown in Fig. 5. The low-resistance baffler discharges into the passage 46, which communicates with the cylinder 27 and the pipe 15, leading to the step-bearing. Within the cylinder is the pressure-equalizer piston 26, provided with a suitable packing 47 on its upper end. The under side of the piston is chambered out to receive the upper end of the spring-pressed rod 30, which normally tends to hold the piston in the raised position. The lower-positioned high-resistance baffler receives fluid from the passage 44, as does also the low-resistance baffler, and discharges it into the pipe 16$^a$, leading to the upper intermediate guide-bearing. In this figure the construction of the strainer 37 is clearly shown. The strainer is provided with a frame 48, which may be formed in a semicircular piece or of several pieces suitably united, and is bolted or otherwise secured to the under side of the cover. The cover as a whole is attached to the casing by bolts and is provided with a shoulder on the under side, which centers it.

The operation of the invention, assuming that the dead-weight accumulator is empty, is as follows: The pump is started into operation, and immediately a pressure exists on the fluid within the pipe 14. The amount of fluid which flows to the bearings and that which flows to the accumulator depends upon the resistance of the bafflers and the dead weight of the accumulator. I prefer to so construct and arrange these parts that the pressure exerted by the accumulator is slightly below the normal pressure exerted on the step-bearing plus the pressure drop due to the baffler at normal flow through the step-bearing. With this arrangement the step-bearing and the accumulator take substantially equal amounts of lubricant until the movable part of the accumulator strikes the stop 13, after which the pressure in the system rises to such a point as is necessary to force all of the oil through the combined resistance of the baffler and bearings. It is to be understood, however, that the pressure on the accumulator is sufficient to supply the necessary amount of lubricant for working conditions, the normal flow being slightly in excess of this. So long as the pump continues in operation the accumulator remains idle; but if anything happens to the pump which disables it wholly or in part the accumulator begins to supply lubricant to the several bearings through the pipe 50 and the bafflers act in precisely the same manner as if the supply was from the pump. When two or more turbines are arranged to receive their supply of lubricant in multiple from the same source, a pipe 51 is provided, which leads to one or more additional machines, as the case may be. Each of these machines will be provided with one or more bafflers, depending on the number and kind of bearings, to regulate the supply thereto. Under normal conditions the pump would furnish all of the fluid necessary to lubricate the bearings for all the machines; but in the event of the failure of the motor, wholly or in part, the dead-weight accumulator comes into service, and the bafflers prevent it from emptying too quickly by regulating the rapidity of flow.

In accordance with the provisions of the patent statutes I have described the principle of operation of my invention, together with the apparatus which I now consider to represent the best embodiment thereof; but I desire to have it understood that the apparatus is only illustrative and that the invention can be carried out by other means.

What I claim as new, and desire to secure by Letters Patent of the United States, is—

1. In a system of forced lubrication, supply and delivery conduits, a baffler for regulating the rate of flow in the conduits comprising a chamber and a screw-threaded plug fitting the chamber, and means for maintaining a closed circuit of the lubricant through the system.

2. In a system of forced lubrication, supply and delivery conduits, a baffler for regulating the rate of flow in the conduits comprising a cylindrical chamber and a plug fitting the chamber and having an external screw-thread, and means for maintaining a closed circuit of the lubricant through the system 3. In combination, a bearing, a source of lubricant under pressure, a conduit leading from the source to the bearing and having a baffler for regulating the rate of flow comprising a chamber and a screw-threaded plug fitting the chamber, and means for permitting the exhaust lubricant to flow away from the bearing.

4. In a system of forced lubrication, a baffler for regulating the rate of flow comprising a cylindrical chamber, a helically-grooved plug in the chamber, and a screw for adjusting the plug in the chamber to vary the effective length of the groove.

5. In a system of forced lubrication, a baffler for regulating the rapidity of flow, comprising a cylindrical chamber having a passage-way opening into it near one end, a cylindrical screw-threaded plug fitting said chamber, and means for adjusting said plug lengthwise in said chamber.

6. In a system of forced lubrication, a baffler for regulating the rapidity of flow, comprising a cylindrical chamber having a passage-way opening into it near one end, a cylindrical screw-threaded plug fitting said chamber, and adjusting-screws tapped into the ends of said plug abutting against the ends of said chamber.

7. In a system of forced lubrication, the combination with two branch conduits, of a baffler device comprising a casting containing two cylindrical chambers, respectively in circuit with said branch conduits, and cylindrical plugs in said chambers provided with external screw-threads, each of different pitch from the other.

8. In a system of forced lubrication, the combination with a baffler, comprising a spiral passage, of a pressure-equalizer.

9. In a system of forced lubrication, the combination with a pump, of a pressure-equalizer, and a baffler between said pump and equalizer for reducing the pressure and flow of lubricant before it acts upon the latter.

10. In a system of forced lubrication, an equalizer comprising a cylinder through which lubricant can freely flow at all times, a piston which moves in and out of the cylinder under the pressure of the lubricant without affecting the amount of flow, a long piston-rod, a spring encircling said rod, and guides for preventing said spring from buckling.

11. In a system of forced lubrication, an equalizer comprising a piston, a long piston-rod, a spring encircling said rod and made in sections, and guide-plates placed between said sections and sliding on said rod.

12. In a system of forced lubrication, a cooler for the lubricant comprising a receiver, a coil of water-pipe therein, a cylinder concentric with said coil, a strainer above said coil, a supply-pipe entering above said strainer, and a discharge-pipe leading from within said cylinder.

13. In a system of forced lubrication, a cooler for the lubricant having a top, and one or more bafflers and a pressure-equalizer mounted in said top.

14. In a system of forced lubrication, a cooler for the lubricant having a top, and one or more bafflers, and a pressure-equalizer mounted in said top, the latter having a spring depending into said cooler.

15. In a system of forced lubrication, a device for straining and receiving the return lubricant, with a second device which reduces and equalizes the pressure of the feed lubricant and combines with the first to form a single structure.

16. In a system of forced lubrication, a cooler for the return lubricant, a baffler for the feed lubricant which is carried by the cooler, and a pump receiving lubricant from the cooler and delivering it through the baffler.

17. In a system of forced lubrication, a cooler, a cover therefor having a strainer-compartment, a plurality of bafflers in the cover, and a conduit connecting the bafflers in multiple with respect to the compartment.

18. In a system of forced lubrication, a cooler, a cover therefor having a strainer-compartment, a plurality of bafflers in the cover, a conduit leading from the compartment to the bafflers, a discharge-conduit leading from each baffler, and a pressure-equalizer carried by the cover and located in a discharge-conduit.

19. In a system of forced lubrication, a receiver for return lubricant, a removable cover for the receiver, a strainer carried thereby, a conduit in the cover through which feed lubricant flows, and a pressure-equalizer arranged in the conduit and carried by the cover.

20. In a system of forced lubrication, a receiver for return lubricant, a cover therefor, strainers carried by and removable with the cover of which one strains the feed and the other the return lubricant, a baffling device for the feed lubricant, and a pressure-equalizing device on the discharge side of the baffler which with the latter is carried by and removable with the cover.

21. In a system of forced lubrication, a receiver for return lubricant, a cover therefor, strainers carried by and removable with the cover of which one strains the feed and the other the return lubricant, a baffling device for the feed lubricant, a pressure-equalizing device on the discharge side of the baffler which with the latter is carried by and removable with the cover, and a cooling-coil in the receiver which is supported by the cover.

22. In a system of forced lubrication, supply and delivery conduits, a baffler for regulating the rate of flow in the conduits comprising a chamber and a helically-grooved plug fitting the chamber, and a strainer in the supply-conduit.

In witness whereof I have hereunto set my hand this 9th day of January, 1905.

AUGUST H. KRUESI.

Witnesses:
BENJAMIN B. HULL,
HELEN ORFORD.